United States Patent [19]

Michel

[11] 3,817,090

[45] June 18, 1974

[54] CORING TESTER FOR ELASTOMER

[75] Inventor: Frank Michel, Brooklyn, N.Y.

[73] Assignee: Pfizer Inc., New York, N.Y.

[22] Filed: Jan. 31, 1973

[21] Appl. No.: 328,478

[52] U.S. Cl............................ 73/81, 73/104
[51] Int. Cl........................... G01n 19/00
[58] Field of Search............ 73/101, 104, 78, 81, 85

[56] References Cited
UNITED STATES PATENTS

| | | | |
|---|---|---|---|
| 1,770,045 | 7/1930 | Shore et al............................ | 73/81 |
| 2,520,387 | 8/1950 | Dobry et al........................... | 73/81 |
| 2,699,540 | 1/1955 | Hunter.................................. | 73/81 |

Primary Examiner—James J. Gill
Assistant Examiner—Anthony V. Ciarlante
Attorney, Agent, or Firm—Connolly and Hutz

[57] ABSTRACT

A reciprocating carriage is adjustably mounted on a support column above a base on which a rubber stoppered bottle is disposed. The carriage reciprocates on slide rods mounted on an indexing bracket adjustably connected to the support column by a rack and pinion. A compression spring urges the carriage down the slide rods to advance the cannula into the rubber seal. An offset eccentric cam and follower reacts between the bracket and the carriage to retract and latch it against the force-applying spring. The cannula support rod is connected through a piston in a cylindrical hole in the carriage into engagement with a force gauge, which indicate the force on the cannula as it pierces the rubber stopper. The support rod is apertured to permit cores of rubber lodged in the cannula to be dislodged by an inserted wire for collection to determine the coring tendency of the rubber and needles in conjunction with the piercing force.

18 Claims, 5 Drawing Figures

PATENTED JUN 18 1974 3,817,090

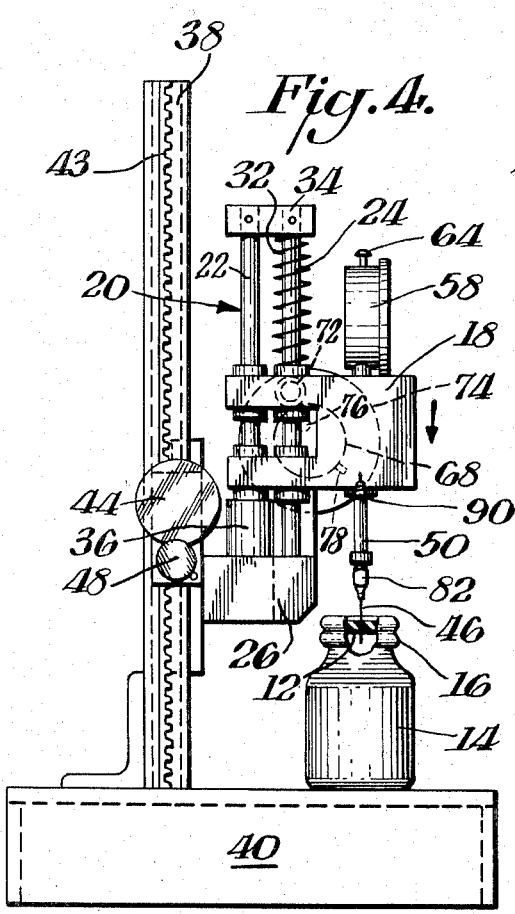
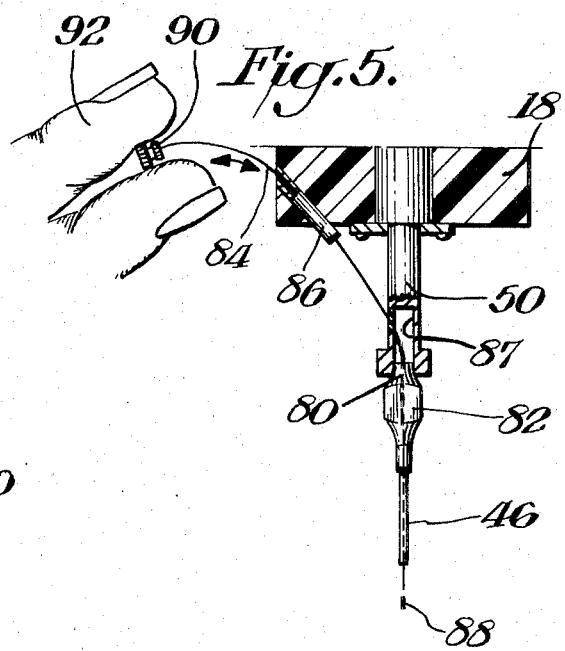

3,817,090

CORING TESTER FOR ELASTOMER

BACKGROUND OF THE INVENTION

Rubber seals tend to leave cores in cannulas or hypodermic needles which pierce them. It is important to minimize this tendency and therefore a sealing rubber stopper is repeatedly pierced to test the characteristic. Manual piercing is ununiform and it does not indicate force requirements. An object of this invention is to provide a device for rapidly performing coring tests on elastomers and hypodermic needles which has uniform characteristics and also indicates the piercing force.

SUMMARY

A cannula support is mounted on a carriage which reciprocally moves from advanced to retracted positions on a guide supported on an indexing bracket. The indexing bracket is adjustably mounted on a support column for adjusting the path of movement of the cannula relative to a sample of elastomer. Either the needle or the elastomer or both may be the subject of the test. The cannula support rod engages a force gauge also mounted on the carriage to provide an indication of the force applied against a cannula as it pierces the elastomer. A force-applying spring reacts between the indexing bracket and the carriage to urge it and a cannula mounted upon it towards the advanced position, whereby the cannula is uniformly urged to pierce a sample of elastomer disposed in its path of movement. A releasable cocking mechanism reacts between the carriage and the indexing bracket for retracting the carriage away from the elastomer and releasing it to permit the force applying spring to uniformly force the cannula through the elastomer. An aperture in the cannula support rod permits a wire to be inserted through it to dislodge retained cores into the pierced container whereby the tendency to core is evaluated. The adjustable coupling is advantageously provided by a rack and pinion connecting the indexing bracket to the support column upon which it may be clamped after adjustment relative to the sample. The carriage is mounted on a reciprocal motion guide, advantageously provided by a pair of slide rods, upon which a force applying compression spring is mounted. The cannula support rod is conveniently engaged with the force gauge by connection through a piston in a cylindrical hole in the carriage. The cocking mechanism is conveniently provided by an eccentric cam and follower which are disposed off center relative to each other and to the path of movement of the carriage and arrested over center to latch the carriage in the retracted position.

BRIEF DESCRIPTION OF THE DRAWING

Novel features and advantages of the present invention will become apparent to one skilled in the art from a reading of the description in conjunction with the accompanying drawings wherein similar reference characters refer to similar parts and in which:

FIG. 4 is a side view in elevation of the embodiment shown in FIGS. 1-3 in the advanced position; and FIG. 5 is an enlarged partially sectioned front view in elevation of the cannula support and clearing portions of the embodiment shown in FIGS. 1-4.

DESCRIPTION OF THE EMBODIMENT

Figure 1:
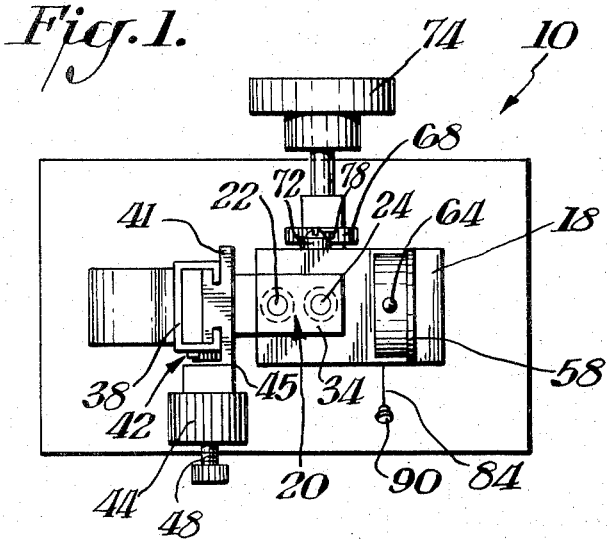
FIG. 1 is a top plan view of one embodiment of this invention.
Figure 2:
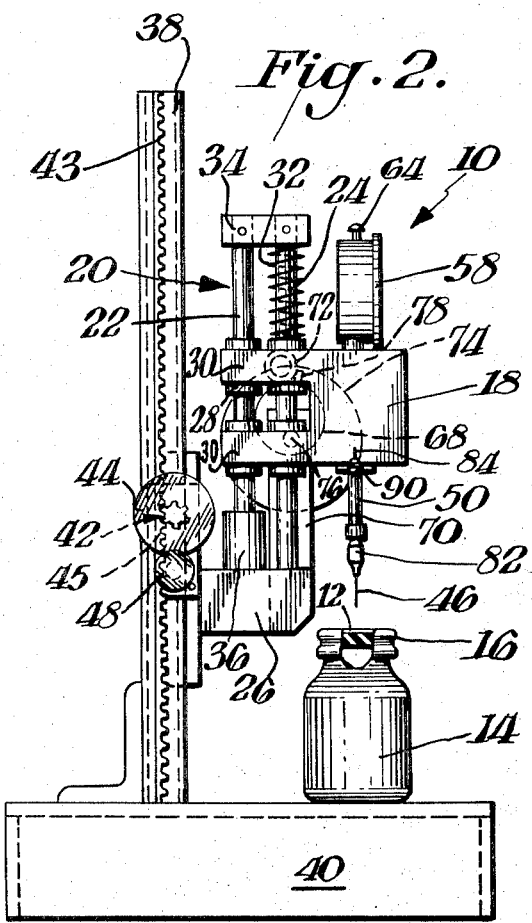
FIG. 2 is a side view in elevation of the embodiment shown in FIG. 1 in the retracted position.
Figure 3:
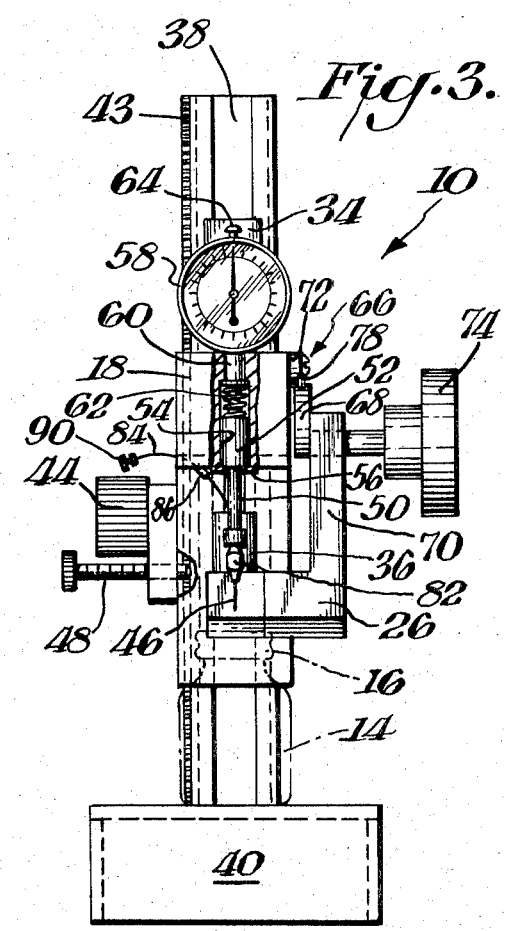
FIG. 3 is a front view in elevation of the embodiment shown in FIGS. 1 and 2.

IN FIGS. 1-3 is shown a coring tester 10 for evaluating the coring tendency of a rubber stopper 12, sealing bottle 14 of the pharmaceutical liquid-containing type having an apertured aluminum cap 16 and cannula 46 which pierces stopper 12. Testing device 10 includes a cannula-supporting carriage 18 mounted to move on a reciprocal motion guide 20 provided by slide rods 22 and 24 mounted on indexing bracket 26 from the retracted position shown in FIGS. 2 and 3 to the advanced position shown in FIG. 4. Carriage 18 has slide bushings 28 or bearings, for example of nylon, inserted through lugs 30. Force-applying compression spring 32 mounted on slide rod 24 reacts between bridge 34 connecting the ends of rods 22 and 24 and carriage 18 to urge it towards the advanced position. Rubber bushing 36 on slide rod 22 on the bottom of slide 22 provides a resilient stop for the lower or advanced position of carriage 18.

Indexing bracket 26 is adjustably connected to support column 38 which is mounted on base 40 upon which bottle 14 is supported during test of its elastomer or rubber stopper 12. Indexing bracket 26 is thus connected to column 38 by its H-shaped cross section slide shoe 41 which is inserted within and engages the edges of C-shaped cross section column 38. Rack and pinion 42 actuated by knurled knob 44 move bracket 26 up and down on column 38. Rack 43 is connected to the side of column 38 and pinion 45 is rotatably mounted on the side of slide shoe 41 in making engagement with rack 43, adjusted to dispose carriage 18 and cannula 46 in the advanced position adjacent stopper 12 prior to a testing operation. Rack and pinion coupling 42 is clamped in position after adjustment by set screw 48.

Cannula 46 is mounted on carriage 18 through carriage support rod 50 which is movably connected to carriage 18 by insertion of its enlarged piston 52 in a cylindrical hole 54 through carriage 18. Enlarged piston end 52 is loosely retained within hole 54 over apertured plate 56 secured to the bottom of carriage 18.

Force gauge 58 is mounted on the top of carriage 18 with its force sensing element 60 in communication with piston 52 through gauge spring 62. Reset button 64 on the top of force gauge 58 resets it to zero after each operation. The connection between cannula 46 and force gauge 58 causes it to indicate the force on cannula 46 as it pierces stopper 12. This force is recorded by the operator as part of the test data.

Carriage 18 is cocked or reset into the retracted position against the force of spring 32 by cocking mechanism 66 which comprises eccentric cam 68 — rotatably connected to the top of arm 70 on indexing bracket 26 — and follower cam 72 rotatably connected to the side of carriage 18 with its axis of rotation slightly offset from the axis of rotation of eccentric cam 68 and with respect to the direction of movement of carriage 18. In other words, vertical centerlines through the axes of rotation of the cams are offset and parallel to each other and to the direction of movement of carriage 18. Eccentric cam 68 is rotated by actuating knob 74 mounted on shaft 76 upon which eccentric cam 68 is also mounted. Projection or pin 78 extends from the periphery of eccentric cam 68 and is offset from the peak of cam 68 in the same direction as the offset of the vertical axis of cam 68 from follower cam 72. Contact of pin 78 with follower cam 72 therefore latches carriage 18 in the retracted position because the downward force of spring 32 then causes follower roller 72 to push downwardly in a counterclockwise direction (as shown in FIG. 2) against eccentric cam 68 and to resultantly force pin 78 into firm arresting contact with follower cam 72.

FIG. 4 shows the advanced position of carriage 18 in the downward direction in which compression spring 32 has forced carriage 18 downwardly on slide rods 22 and 24 to its lower limit of travel defined by rubber bushing 36. This is permitted by counterclockwise rotation of actuating knob 74 (as shown in FIG. 3) about ½ turn which unlatches carriage 18 and then permits spring 32 to apply a uniform piercing force to urge cannula 46 through rubber stopper 12 in a path of travel which is about ⅝ inch long. During this operation the technician can observe the piercing force on gauge 58 and record it in the test data.

FIG. 5 shows how cannula 46 is mounted on cannula support rod 50 by a coupling, for example, provided by a tapered end 80 on support rod 50 into the hub 82 of cannula 46 which is, for example, a standard hypodermic needle — such as No. 21 needle, ¾ inch long.

FIG. 5 also shows cannula clearing wire 84 inserted through bushing 86 in the bottom of carriage 18 and through an aperture (not shown) in the side of support rod 50 and ultimately through the axis of cannula 46 to dislodge any rubber core 88 from cannula 46 as shown in FIG. 5. Support rod 50 thus has a tubular end 87 to facilitate insertion of wire 84 through it by manipulation of wire knob 90 held between the fingers 92 of an operator.

The coring tendency of a stopper or cannula is evaluated by the amount of rubber cores dislodged into a sealed bottle by a given number of piercing movements. The uniformity of the force applying source 32 through the uniform stroke makes the ultimate results more uniform and meaningful. These results are averaged both as to amount of cores collected and the force necessary to pierce. The piercing force is indicative of the hardness of the elastomer. This device also makes the testing operation much more rapid than a manual operation as well as more meaningful and uniform, which is very important in testing and evaluating the tendency of a cannula to core. Tester 10 is, therefore, uniquely efficient for testing the coring tendency of cannulas which vary significantly by process of and particular manufacture. To test an elastomer, one or more standardized cannulas are used; and for testing a cannula, one or more standardized elastomer stoppers are used.

I claim:

1. A device for testing the coring characteristics of an elastomer comprising a base, a support column mounted upon said base, an indexing bracket, adjustable coupling means connecting said indexing bracket at a selectable distance from a sample of said elastomer, a carriage, a force gauge mounted on said carriage, a cannula support rod, a motion-permitting coupling connecting said cannula support rod to said carriage and to said force gauge whereby said force gauge provides an indication of the force applied against a cannula mounted on said cannula support rod, a reciprocal motion guide mounting said carriage on said indexing bracket for movement from a retracted position of said cannula to an advanced position, a force-applying means reacting between said indexing bracket and said carriage in a direction urging said carriage and said cannula support rod towards said advanced position and to allow said force-applying means to move said cannula into said advanced position for piercing said elastomer whereby a cannula upon said support rod is uniformly urged to pierce a sample of elastomer disposed of in its path of movement, a releasable cocking mechanism reacting between said carriage and said indexing bracket in a direction to dispose said carriage in said retracted position, and an aperture in said cannula support rod for insertion of wire through a cannula mounted on said support rod for dislodging cores of elastomer contained within said cannula after it has pierced through said sample of elastomer.

2. A device as set forth in claim 1 wherein said adjustable coupling comprises a rack and pinion.

3. A device as set forth in claim 2 wherein said adjustable coupling includes a manually operable clamp.

4. A device as set forth in claim 1 wherein said reciprocal motion guide comprises a rod and slide bearings.

5. A device as set forth in claim 1 wherein said force applying means comprises a compression spring.

6. A device as set forth in claim 5 wherein said reciprocal motion guide comprises a slide rod and bearings, and said force applying means, comprising a compression spring being mounted upon said slide rod for reaction between the end of said rod remote from said indexing bracket and said carriage.

7. A device as set forth in claim 6 wherein said slide rod and bearing comprise a pair of rods mounted parallel to each other upon said indexing bracket, a pair of slide bearings in said carriage engaged upon said rods, a bridge connecting the ends of said rod remote from said indexing bracket, and said compression spring being mounted on one of said rods and reacting between said bridge and said carriage.

8. A device as set forth in claim 1 wherein said motion permitting coupling comprises a hole in said carriage disposed substantially parallel to the direction of movement of said reciprocal motion guide and a piston sliding within said hole which is connected to said cannula support rod.

9. A device as set forth in claim 8 wherein said force gauge has a force sensing element, and said force sensing element being disposed in said hole for forceable contact with said piston.

10. A device as set forth in claim 9 wherein a gauge compression spring is mounted in said hole between said piston and said force sensing element.

11. A device as set forth in claim 1 wherein said releasable cocking mechanism comprises a follower roller mounted on said carriage and a rotatable eccentric roller mounted on said indexing bracket, and said rollers contacting each other to permit said carriage to be moved against said force applying means to set said carriage in said retracted position and to be moved by said force-applying means to said advanced position when said releasable cocking mechanism is released.

12. A device as set forth in claim 11 wherein said releasable cocking mechanism includes latching means for holding said carriage in said retracted position against said force applying means.

13. A device as set forth in claim 12 wherein said latching mechanism comprises an offset disposition of the axes of rotation of said rollers relative to each other and to the direction of movement of said carriage, and a projection on the surface of said eccentric roller offset from its peak in the same direction as its axis of rotation is offset from the axis of rotation of said follower roller.

14. A device as set forth in claim 1 wherein the end of said cannula support rod remote from said carriage includes a cannula coupling.

15. A device as set forth in claim 14 wherein said cannula coupling comprises a slightly tapered end of said support rod.

16. A device as set forth in claim 1 wherein a cannula clearing wire is movably mounted on said aperture in said cannula support rod for clearing cores of elastomer from a cannula mounted on said support rod after it has pierced an elastomer.

17. A device as set forth in claim 16 wherein a portion of said cannula clearing wire is movably mounted on said carriage.

18. A device as set forth in claim 17 wherein said portion of said cannula clearing wire mounted on said carriage is inserted within a slide bushing on said carriage.

* * * * *